Nov. 1, 1949.   J. WALTERS   2,486,510
STEERING AND LIKE GEARING
Filed May 25, 1945   2 Sheets-Sheet 1
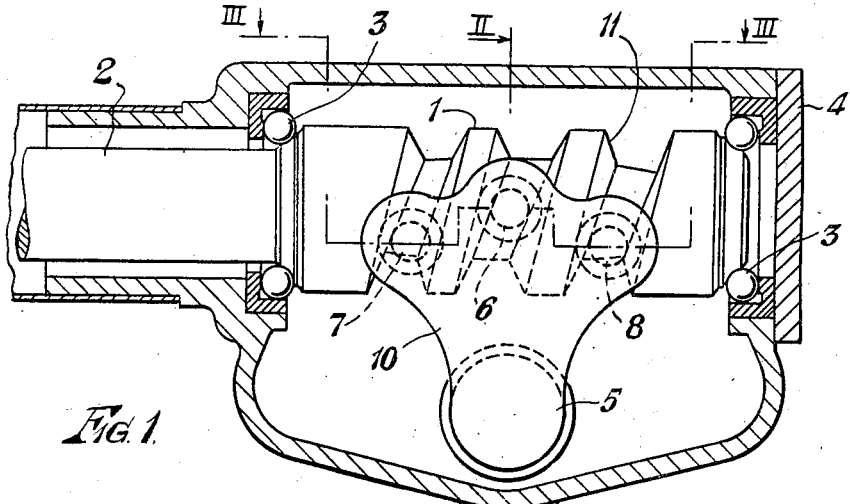
Fig. 1
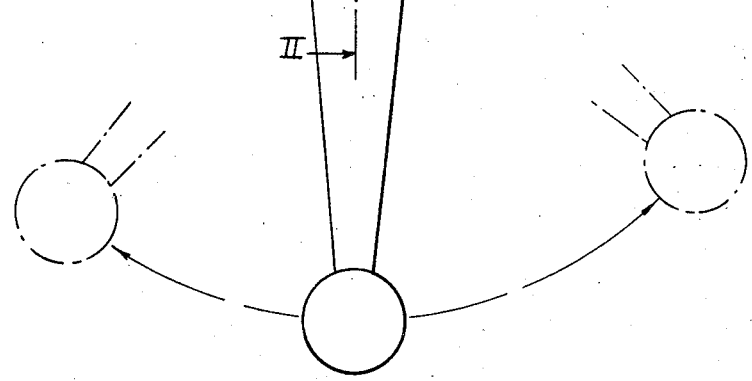
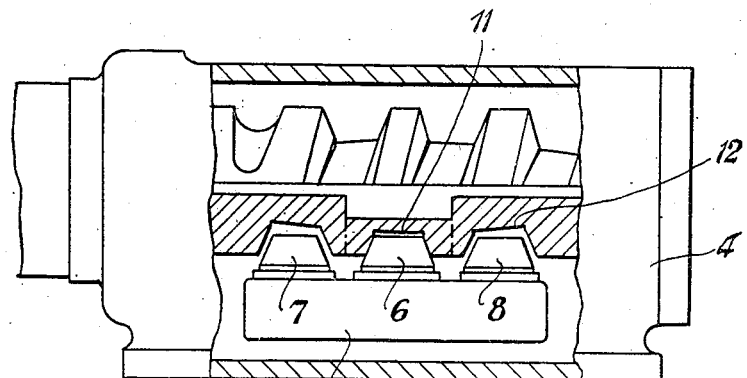
Fig. 3
Joseph Walters
INVENTOR
By George H. Corey
His Attorney

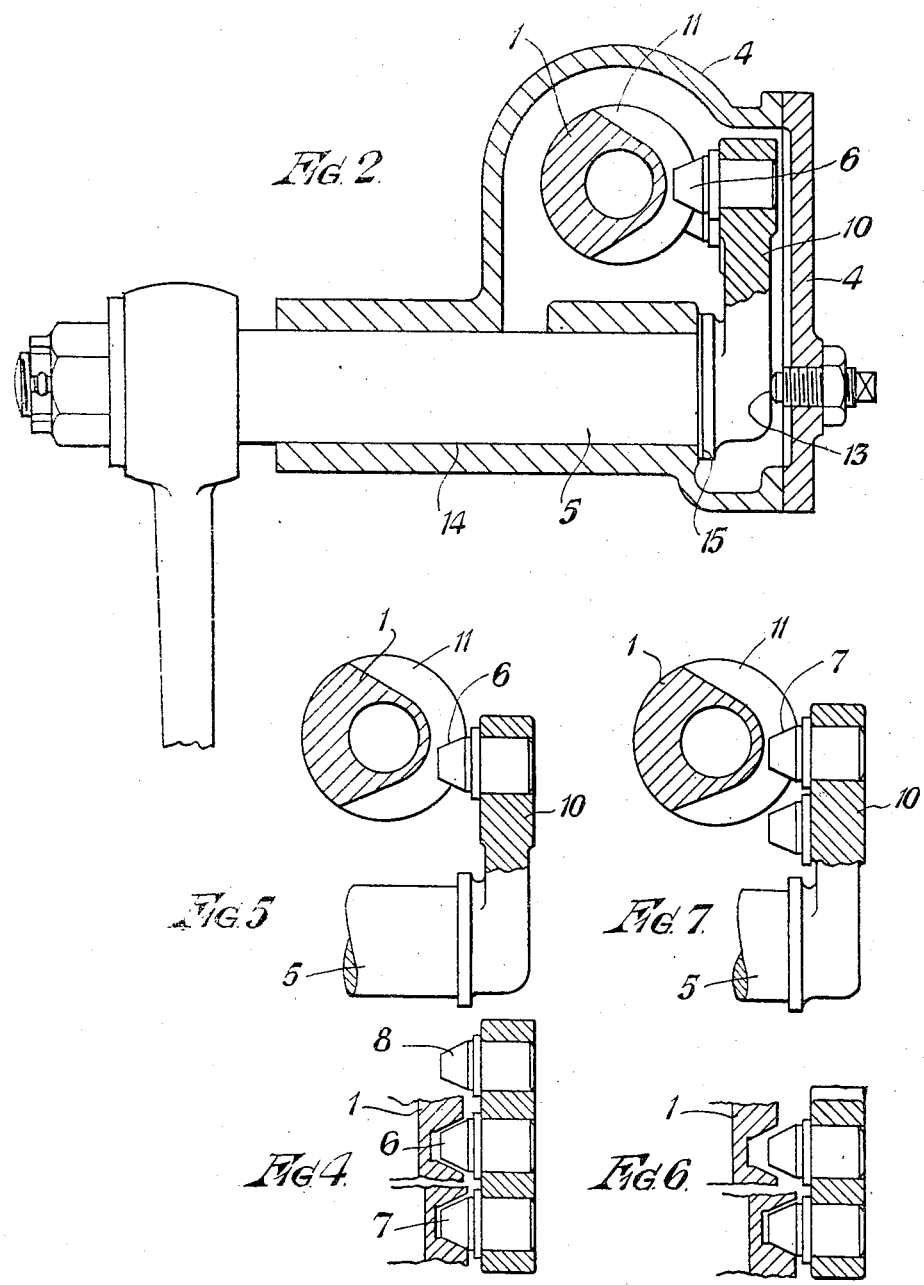

Patented Nov. 1, 1949

2,486,510

UNITED STATES PATENT OFFICE 2,486,510

STEERING AND LIKE GEARING

Joseph Walters, Luton, England

Application May 25, 1945, Serial No. 595,695
In Great Britain June 20, 1944

9 Claims. (Cl. 74—500)

1

The present invention relates to improvements in steering gear of the type in which a worm or like cam, having a track or groove, is engaged by one or more pegs or rollers mounted on a rocker arm.

The invention has as its object to provide improvements in the above type of gear whereby friction between the peg or pegs and the cam is reduced making for lightness of operation.

One of the main features of the invention is the provision of a cam and rocker arm in which the cam is provided with a helical groove in which is engaged a peg or pegs on the rocker arm, the assembly being such that the peg or one of the pegs is engaged in the groove to give contact bearing on both flanks of the groove only when the peg is on the vertical centre line, this being a position which may correspond to the position of the steering gear for the straight ahead movement of the vehicle.

It is preferred that the cam groove be of V profile and one feature of the invention includes the provision of a clearance groove at the root of the cam groove in which the peg or pegs of the rocker arm is not engaged. Naturally with a V profile cam groove the peg or pegs are of frusto-conical formation and each peg or some of the pegs may be of the roller type. This clearance groove is provided to enable easy and rapid correction by grinding of the hardening distortion caused by the heat treatment to which the worm is subjected.

In a preferred construction the cam in the form of a worm is assembled in a suitable housing with a rocker arm which is provided with a number of conical pegs, two of which pegs are adapted at any one time to lie in the cam groove and one of which pegs is adapted to make simultaneous contact bearing on both flanks of the cam groove when on the vertical centre line for straight ahead movement of the vehicle and on only one flank when off the centre line.

The remainder of the pegs are adapted to bear only on one flank of the groove when in driving engagement therewith the groove being cut so that except momentarily and at certain positions only one peg is ever in driving contact with the cam groove, a second peg, however, being adapted to lie in the groove so that, in the event of the first peg breaking, it can take the drive from the cam. The shape of cam groove required to enable such operation between the cam groove and the pegs is one which gives a truly constant velocity pitch and one in which the helix angle of the cam groove varies constantly in angular dimension,

2 being greater at the lower end of the worm and smaller at the upper end. The pegs which engage the groove are spaced in pitch: that is to say, for example, in the case of 18:1 ratio gear, the pegs are spaced at an angle of 20° about their turning point.

The invention will now be described with reference to the accompanying drawings, in which—

Figure 1 shows partly in side elevation and partly in section a steering gear constructed in accordance with the present invention.

Fig. 2 shows a section on the line II—II of Fig. 1.

Fig. 3 shows a section on the line III—III of Fig. 1.

Fig. 4 shows on a somewhat reduced scale in a section on a level with the pegs the relative position of the pegs and the worm in the half-lock position.

Fig. 5 shows also upon a reduced scale the section on the same line as II—II of Fig. 1 in the half-lock position of the gear.

Fig. 6 shows in similar section as that of Fig. 4 the relative positions between the pegs and the worm; and Fig. 7 shows a section in the full-lock position of the gear upon the lines II—II of Fig. 1.

Referring to the drawing, I indicates a cylindrical cam formed on a lower end of a steering column 2, the cam being mounted in anti-friction bearings 3, in housing 4.

Rotatably mounted in the casing 4 is a rocker shaft 5 formed with a rocker arm 10, which carries three pegs 6, 7 and 8, all being of a truncated conical form and the axes of which lie parallel with that of the rocker 5. These pegs are adapted to extend into the V groove II of the cam I.

The V groove II is produced by grinding so that the helix angle of the groove varies constantly in angular dimension from one end to the other and so that a constant velocity pitch over the operative portion of the groove is achieved.

The peg 6 is of the fixed type and when lying on the vertical centre line as shown in Figs. 1, 2 and 3, is adapted to make bearing contact on both flanks of the V groove II. This centre peg 6 is positioned upon the rocker arm so that on the centre line, which may be a position of the steering gear for the normal straight ahead movement of the vehicle, the axis of the peg 6 lies level with the axis of the cylindrical cam I, and at all other times this peg 6 lies between its turning point, namely the axis of the rocker shaft 5, and the axis of the cam I.

Pegs 7 and 8 are preferably of the roller type and in the position shown in Fig. 1, they both lie in the V groove 11, but do not make contact with this groove; this is clearly shown in Fig. 3. These two pegs 7 and 8 are mounted so as to rotate about the axis of the rocker shaft on a slightly smaller radius than that of the centre peg 6.

With the pegs 7 and 8 so mounted it will be apparent that these pegs never lie level with the axis of the cam 1.

The effect of assembling the pegs in this manner and by providing a cam groove of the shape above described is as follows:

In the straight ahead position as shown in Figs. 1, 2 and 3, the centre peg 6 makes contact bearing on both flanks of the V groove 11, and the other two pegs 7 and 8, whilst lying in the V groove do not make contact therewith.

As the steering column is rotated, let us say, so as to steer the vehicle to the right, the centre peg 6, once it is off the centre line ceases to make contact with both flanks of groove 11, and only makes contact with the flank from which it is receiving the driving pressure according to the direction of rotation of the cam 1. At the same time the peg 6 is gradually withdrawn from the groove and the peg 7 gradually enters deeper into the groove until it makes contact with one flank of the groove 11. Once the peg 7 receives the drive from the cam 1, the centre peg 6 is pushed clear of the flank from which it was receiving the drive so that in the half-lock position the pegs assume the position shown in Fig. 4—peg 7 receives drive, peg 6 lies in the V groove, but does not make contact and peg 8 lies clear of the cam.

Continuation of the rotation of the steering column to the full-lock position fetches the peg 7 on to the vertical centre line and the position of the pegs is as shown in Fig. 6.

Reversal of the steering column to the straight ahead position effects the reversal of the position of the pegs 6, 7 and 8, until once again the peg 6 lies with contact bearing on both flanks of the groove 11, in the straight ahead position. Naturally on reversal of the steering column, the drive to the pegs is transmitted from the other flank of the V groove 11.

Rotation of the steering column to give a left hand full-lock is exactly the same except that peg 8 assumes the role of peg 7 and the drive is transmitted from the other flank of the V groove 11.

It will be apparent from the above description that it is only when the gear is in the position for normal and straight ahead movement of the vehicle that contact with both flanks is made by the pegs and then only by the centre peg 6. At all other positions, except when the reception of the drive from the cam 1 is passing from one peg to another contact is made only with one flank of the groove 11. However, at all positions there are at least two pegs actually lying in the groove: one peg being the one which is receiving the drive from the cam and the other peg which is not making contact with the groove, but which lies sufficiently in the groove to serve in the event of breakage of the peg in operation. With the peg positioned as shown in the drawings it would be possible to steer the vehicle whichever peg broke and the clearances are such that a sudden breaking of any of the pegs would not cause an uncontrollable swerving of the vehicle.

A great advantage of the steering assembly of the present invention lies in the fact that the drive from the worm to the rocker arm is always taken by a peg lying within about 20° of the centre vertical line. This results in a high degree of efficiency not possessed by that type of gear in which the pegs remain in engagement with the worm for substantially the whole swing of the rocker arm since it is well known that the greater the angle which the peg or pegs receiving the drive make with the centre vertical line the greater the loss in efficiency of the gear through frictional loss.

In producing the V groove 11, it has been found that an accurately cut V groove 11 can be produced economically by forming the initial groove so that a clearance space 12 is left at the root of the V groove 11 to permit entry to the grinders. The pegs never enter this clearance space 12, their deepest entry being substantially the position shown by the peg 6 in the Fig. 3.

The positioning of the pegs 6, 7 and 8, accurately within the groove 11 is facilitated by the construction shown in Fig. 2. The rocker shaft 5 is held in position within the housing 4 by a locking screw 13. This locking screw 13 maintains the rocker shaft 5 in its bearing 14 in the housing 4 and the final adjustment is made by the provision of packing washers or shims 15. This method of locating the pegs 6, 7 and 8 is both economic and highly accurate.

What I claim is:

1. A steering gear comprising a cam supported to be rotatable on an axis and provided with a cam groove of generally helicoidal form extending about said axis, and a rocker arm supported for pivotal movement thereof reciprocatably upon an axis extending in a plane which is perpendicular to the axis of said rotatable cam, said axis of said rocker arm being offset in said plane from said axis of said cam, said rocker arm carrying a plurality of teeth spaced thereon about said axis thereof, said teeth projecting from said arm in generally parallel relation to each other and to the axis of said rocker arm so as to lie respectively within spaced portions of said helicoidal groove, the middle portion of the length of said groove being so formed relative to a given one of said teeth as to receive said tooth in bearing relation to both flanks of said groove when said given tooth is in said plane which is perpendicular to the axis of said cam and which contains the axis of said rocker arm, the teeth adjacent said given tooth at either side thereof being so positioned on said rocker arm relative to said given tooth and the portions of said helicoidal groove within which they lie being so formed relative to said adjacent teeth that when said adjacent teeth respectively are in said plane perpendicular to the axis of said cam they bear only against one flank of their respective portions of said groove and when at their respective sides of said plane are clear of both flanks of said groove.

2. A steering gear comprising a cam supported to be rotatable on an axis and provided with a cam groove of generally helicoidal form extending about said axis, and a rocker arm supported for pivotal movement thereof reciprocatably upon an axis extending in a plane which is perpendicular to the axis of said rotatable cam, said axis of said rocker arm being offset in said plane from said axis of said cam, said rocker arm carrying at least three teeth spaced thereon about said axis thereof, said teeth projecting from said arm in generally parallel relation to each other and to the axis of said rocker arm so as to lie respectively within spaced portions of said helicoidal groove, the middle portion of the length of said groove being so formed relative to a given one of said teeth as to receive said tooth in bearing relation to both flanks of said groove when said given tooth is in said plane which is perpendicular to the axis of said cam and which contains the axis of said rocker arm, the teeth adjacent said given tooth at either side thereof being positioned on said rocker arm at a radius from the axis of said rocker arm less than that of said given tooth, said adjacent teeth being so spaced from said given tooth and being so formed relative to said helicoidal groove that when said adjacent teeth respectively are in said plane perpendicular to the axis of said cam they bear only against one flank of their respective portions of said groove and when at their respective sides of said plane are clear of both flanks of said groove, said bearing flanks of said groove being oppositely positioned in said two portions of said groove with respect to said adjacent teeth.

3. A steering gear as defined in claim 1 in which the line of the bottom of said helicoidal groove on the meridian section is on a curve convex to the axis of said cam.

4. A steering gear as defined in claim 1 in which said teeth are of conical form with the axes of the cones parallel to the axis of the rocker arm.

5. A steering gear as defined in claim 2 in which the radii from the axis of said rocker arm to said teeth in relation to the pitch thereof are such that the angular spacing of said teeth is not substantially greater than 20°.

6. A steering gear as defined in claim 1 in which said helicoidal groove is of V section in the meridian plane of said cam and the root of the groove is depressed in rectangular form to provide clearance for said teeth.

7. A steering gear as defined in claim 1 in which said helicoidal groove is cut with a profile in the meridian section with a constant velocity pitch and with a varying helix angle.

8. A steering gear as defined in claim 2 in which the radius to said given tooth is not substantially greater than the perpendicular distance in said plane between the axis of said rocker arm and the axis of said cam.

9. A steering gear comprising a cam supported to be rotatable on an axis and provided with a cam groove of generally helicoidal form extending about said axis, and a rocker arm supported for pivotal movement thereof reciprocatably upon an axis extending in a plane which is perpendicular to the axis of said rotatable cam, said axis of said rocker arm being offset in said plane from said axis of said cam, said rocker arm carrying at least three teeth spaced thereon about said axis thereof, said teeth projecting from said arm in generally parallel relation to each other and to the axis of said rocker arm so as to lie respectively within spaced portions of said helicoidal groove, a given one of said teeth being positioned on said rocker arm at a radius from the axis of said rocker arm substantially equal to the perpendicular distance between said axis and the axis of said rotatable cam in said plane which contains the axis of the rocker arm, the teeth adjacent said given tooth at either side thereof being positioned on said rocker arm at a radius from the axis thereof less than that of said given tooth, said radius of said adjacent teeth and the angular spacing thereof from said given tooth being such as to position at least one of said adjacent teeth in said helicoidal groove simultaneously with said given tooth throughout movement of said given tooth concomitantly with rotation of said rotatable cam to effect said reciprocating movement of said rocker arm, the middle portion of the length of said groove of said rotatable cam being formed relative to said given tooth so as to receive said given tooth in bearing relation to both flanks of said groove when said given tooth is in said plane perpendicular to the axis of said cam which contains the axis of said rocker arm, said adjacent teeth being so formed relative to said helicoidal groove that when said adjacent teeth respectively are in said plane perpendicular to the axis of said cam they bear only against one flank of their respective portions of said groove and when at their respective sides of said plane are clear of both flanks of said groove.

JOSEPH WALTERS.

REFERENCES CITED

The following references are of record in the file of this patent:

UNITED STATES PATENTS

| Number | Name | Date |
| --- | --- | --- |
| 1,814,988 | Weller | July 14, 1931 |
| 1,847,721 | Marles | Mar. 1, 1932 |
| 2,071,235 | Newman | Feb. 16, 1937 |

FOREIGN PATENTS

| Number | Country | Date |
| --- | --- | --- |
| 502,036 | Great Britain | Mar. 9, 1939 |
| 554,280 | Great Britain | June 28, 1943 |